(12) United States Patent  
Honma

(10) Patent No.: US 8,983,558 B2
(45) Date of Patent: Mar. 17, 2015

(54) HOUSING, AND A MOBILE DEVICE INCORPORATING SAME

(71) Applicant: NEC Corporation, Tokyo (JP)

(72) Inventor: Yasuyuki Honma, Shizuoka (JP)

(73) Assignee: Lenovo Innovations Limited (Hong Kong), Quarry Bay (HK)

( * ) Notice: Subject to any disclaimer, the term of this patent is extended or adjusted under 35 U.S.C. 154(b) by 0 days.

(21) Appl. No.: 14/064,747

(22) Filed: Oct. 28, 2013

(65) Prior Publication Data

US 2014/0051487 A1 Feb. 20, 2014

Related U.S. Application Data

(62) Division of application No. 13/416,644, filed on Mar. 9, 2012, now Pat. No. 8,588,872, which is a division of application No. 12/063,439, filed as application No. PCT/JP2006/316500 on Aug. 23, 2006, now Pat. No. 8,204,559.

(30) Foreign Application Priority Data

Aug. 24, 2005 (JP) ................................. 2005-242667

(51) Int. Cl.
*H04M 1/00* (2006.01)
*H04M 1/02* (2006.01)

(52) U.S. Cl.
CPC .......... *H04M 1/0214* (2013.01); *H04M 1/0266* (2013.01); *H04M 2250/16* (2013.01)
USPC ....................................................... 455/575.3

(58) Field of Classification Search
USPC ....................................................... 455/575.3
See application file for complete search history.

(56) References Cited

U.S. PATENT DOCUMENTS

| 6,754,507 | B2 | 6/2004 | Takagi |
| 7,228,112 | B2 | 6/2007 | Ota et al. |
| 7,271,861 | B2 | 9/2007 | Yamazaki |
| 7,324,172 | B2 | 1/2008 | Yamazaki |
| 7,519,174 | B2 | 4/2009 | Tanaka et al. |
| 7,630,741 | B2 | 12/2009 | Siddiqui et al. |
| 7,676,242 | B2 | 3/2010 | Siddiqui et al. |
| 7,684,836 | B2 | 3/2010 | Taneda et al. |
| 7,885,653 | B2 | 2/2011 | Yamamoto et al. |

(Continued)

FOREIGN PATENT DOCUMENTS

| EP | 1 148 693 | 10/2001 |
| EP | 1 178 647 | 2/2002 |

(Continued)

OTHER PUBLICATIONS

Japanese Patent Office issued a Japanese Office Action dated Jul. 14, 2009, Application No. 2005-242667.

(Continued)

*Primary Examiner* — Kwasi Karikari
(74) *Attorney, Agent, or Firm* — Young & Thompson

(57) ABSTRACT

In the present invention, a rear cover 1 of a display part is made of at least a resin material, and a rear cover 4 of an operation part is made of a metal material. Respective plane portions of a front case 2 of the display part and a front case 3 of the operation part are made mainly of a metal material, and at least hinge parts 2c and 3c, which are formed on the front case 2 of the display part and the front case 3 of the operation part, are made of a resin material.

5 Claims, 6 Drawing Sheets

(56) References Cited

U.S. PATENT DOCUMENTS

| | | | |
|---|---|---|---|
| 8,204,559 | B2 | 6/2012 | Honma |
| 8,265,716 | B2 | 9/2012 | Kajiwara et al. |
| 2001/0034242 | A1* | 10/2001 | Takagi .................. 455/550 |
| 2002/0042252 | A1 | 4/2002 | Toyoda et al. |
| 2002/0072335 | A1 | 6/2002 | Watanabe |
| 2004/0058721 | A1 | 3/2004 | Kanazawa et al. |
| 2004/0132514 | A1 | 7/2004 | Lee |
| 2008/0009249 | A1 | 1/2008 | Kanazaqa et al. |
| 2012/0172092 | A1 | 7/2012 | Honma |

FOREIGN PATENT DOCUMENTS

| | | |
|---|---|---|
| EP | 1 401 111 | 3/2004 |
| JP | H-08274483 A | 10/1996 |
| JP | 2908432 | 4/1999 |
| JP | 2000-151132 | 5/2000 |
| JP | 2001-007905 A | 1/2001 |
| JP | 2002-064283 | 2/2002 |
| JP | 2003-031961 | 1/2003 |
| JP | 2003-031962 | 1/2003 |
| JP | 2003-258446 | 9/2003 |
| JP | 2004-7262 | 1/2004 |
| JP | 2004-166191 | 6/2004 |
| JP | 2004-228238 | 8/2004 |
| JP | 2005-033320 | 2/2005 |
| JP | 2005-123735 | 5/2005 |
| JP | 2005-154864 | 6/2005 |
| JP | 2005-210419 | 8/2005 |
| JP | 2006-011163 | 1/2006 |
| JP | 2007-060249 | 3/2007 |
| JP | 2009-246819 | 10/2009 |

OTHER PUBLICATIONS

Extended European Search Report dated Jul. 25, 2012 issued by the European Patent Office in European Patent Application No. 06796664.8, 9 pages.

JP Office Action dated Mar. 5, 2013, with English Translation; Application No. 2011-120877.

JP Office Action dated Dec. 24, 2013, with English translation; Application No. 2013-097997.

Japanese Office Action dated Sep. 24, 2014; Application No. 2013-097997. Partial translation.

* cited by examiner

HOUSING, AND A MOBILE DEVICE INCORPORATING SAME

CROSS REFERENCE TO RELATED APPLICATIONS

This application is a division of co-pending application Ser. No. 13/416,644 filed on Mar. 9, 2012, which is a division of Ser. No. 12/063,439 filed on Feb. 11, 2008, which is a National Stage of Application No. PCT/JP2006/316500 filed on Aug. 23, 2006, which claims foreign priority to Japanese Application No. 2005-242667 filed on Aug. 24, 2005. The entire content of each of these applications are hereby expressly incorporated by reference.

TECHNICAL FIELD

The present invention relates to a foldable mobile device in which a case of a display part and a case of an operation part are connected via a hinge part.

Background Art

In the market for mobile devices of recent years typified by mobile phones and the like, foldable mobile devices in which the cases of a display part and the cases of an operation part are connected via hinge parts have become a main stream, and foldable mobile devices which are miniaturized and reduced in thickness are in high demand.

As a result, foldable mobile devices which are miniaturized and reduced in thickness are provided to the market one after another. However, when trying to reduce the thickness of the device, developing an excellent design and mechanical strength is always an issue.

For example, Japanese Patent Laid-Open No. 2005-154864 proposes applying plating treatment that has high uniformity to cases that are made of resin, which are used for low voltage product such as a mobile phone and a notebook type personal computer. In this art, the resin case is caused to adsorb a catalyst, a base metal is precipitated over the resin case in an electroless plating bath, the resin case is dipped into a plating bath obtained by adding an organic acid or organic acid salt such as acetic acid or nickel acetate to a nickel sulfamate bath or a nickel-cobalt sulfamate bath, and nickel is electrolytically precipitated so that the thickness of the plating film of nickel is about 5 μm to 30 μm, whereby rigidity and hardness of the resin plating can be enhanced by using nickel sulfamate for the plating bath.

Disclosure of the Invention

However, the above described related art has the following problem.

When the entire case is configured by a resin material, it becomes difficult to secure sufficient mechanical strength, as the thickness of the foldable mobile device is reduced. When the entire case is made of metal, it is difficult to achieve unlimited design flexibility and difficult to form complicated shapes in the parts, which are to be fitted. Therefore, a thin foldable mobile device which is excellent in design and secures mechanical strength cannot be provided. The problem similarly applies to the art disclosed in the above described Japanese Patent Laid-Open No. 2005-154864.

Thus, an object of the present invention is to provide a foldable mobile device having an excellent design and reliable mechanical strength, and a method for manufacturing a case of the same.

In order to attain the above described object, a foldable mobile device of the present invention includes a case of a display part case including a front case of the display part and a rear cover of the display part, a case of an operation part including a front case of the operation part and a rear cover of the operation part, and a hinge part connecting the case of the display part and the case of the operation part. The rear cover of the display part is made of at least a resin material. The rear cover of the operation part is made of a metal material. The front case of the display part and the front case of the operation part are made of a composite material comprising a resin and a metal.

A method for manufacturing a case of a foldable mobile device according to the present invention is a method for manufacturing a case of a foldable mobile device including a case of a display part including a front case of the display part and a rear cover of the display part, a case of an operation part including a front case of the operation part and a rear cover of the operation part, and a hinge part connecting the case of the display part and the case of the operation part, and includes forming the rear cover of the display part of at least a resin material, forming the rear cover of the operation part of a metal material, and forming the front case of the display part and the front case of the operation part of a composite material comprising a resin and a metal.

According to the present invention, a foldable mobile device having an excellent design and reliable mechanical strength can be provided.

BEST MODE FOR CARRYING OUT THE INVENTION

Figure 1:
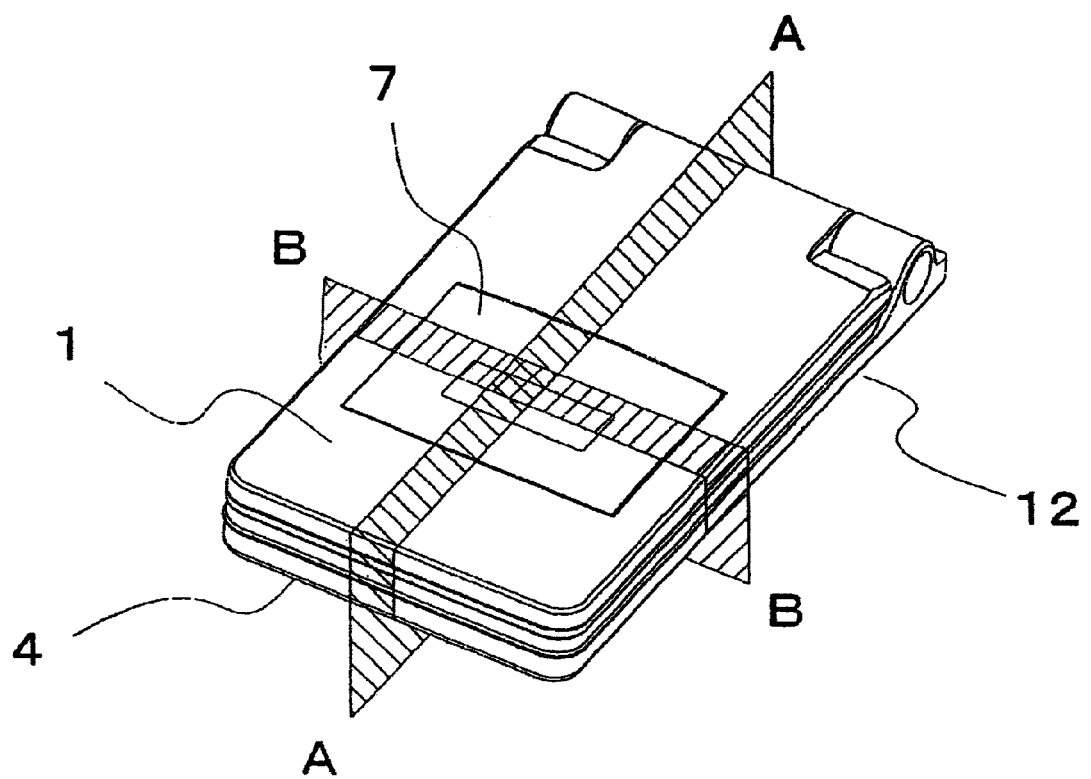
FIG. 1 is a perspective view showing a closed state in a foldable mobile phone of an exemplary embodiment.

Hereinafter, an exemplary embodiment of the present invention will be described in detail with reference to the drawings. In this embodiment, the present invention is applied to a foldable mobile phone as an example of foldable mobile devices, and for example, information processing devices such as a PDA (Personal Data Assistant) and a notebook type personal computer are naturally included as examples of foldable mobile devices. Common parts in the respective drawings are assigned with the same reference numerals and characters.

Figure 2:
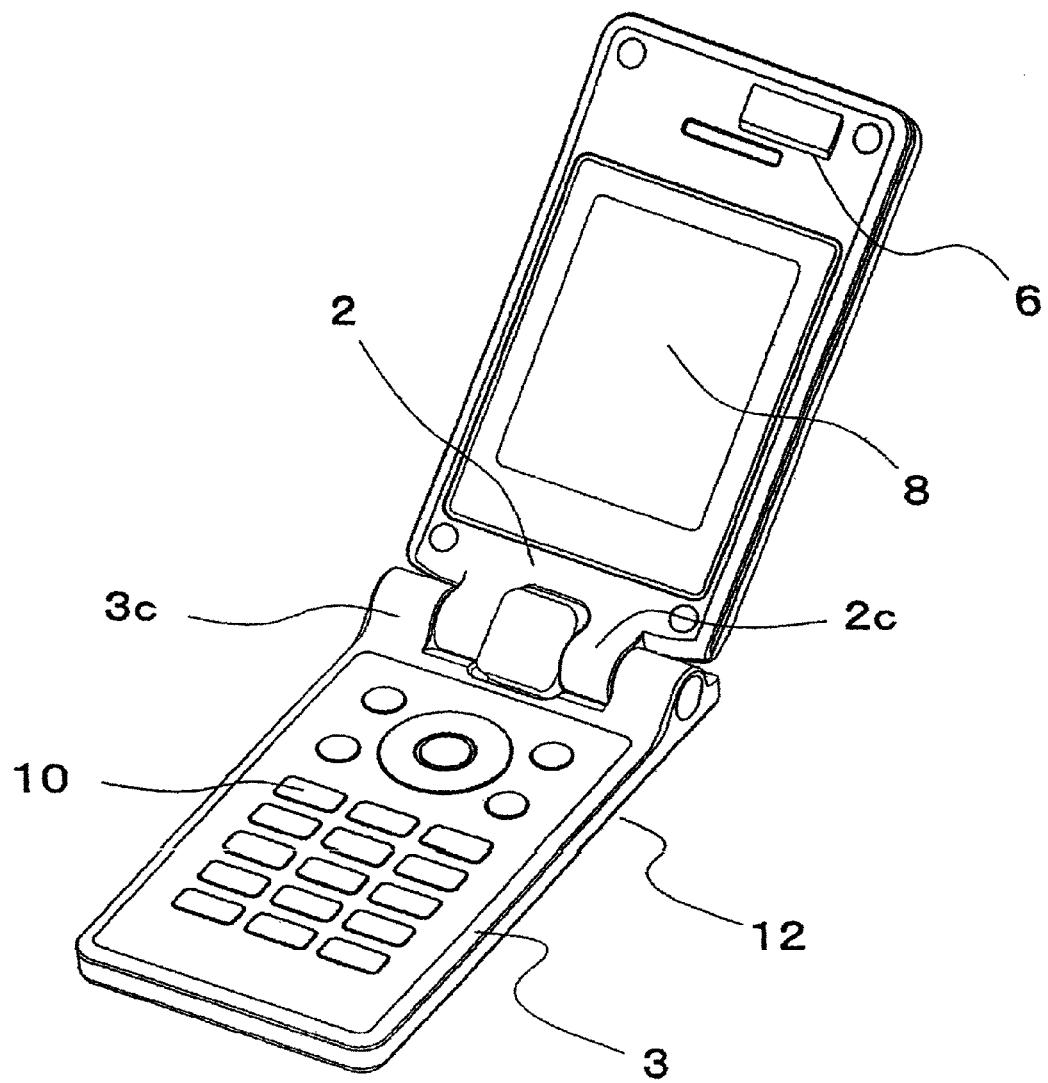
FIG. 2 is a perspective view showing an opened state in the foldable mobile phone of the exemplary embodiment.

FIG. 1 is a perspective view showing a closed state in foldable mobile phone 12 of this exemplary embodiment. FIG. 2 is a perspective view showing an opened state in foldable mobile phone 12 of this exemplary embodiment.

As shown in FIGS. 1 and 2, foldable mobile phone 12 is configured by including, for the case of a display part, rear cover 1 of a display part especially including many design elements and including sub display part 7, and front case 2 of the display part including main display part 8 and hinge part 2c, and for the case of an operation part, rear cover 4 of the operation part including especially fewer design elements, and front case 3 of the operation part including key operation part 10 and hinge part 3c, as main components.

Figure 3:
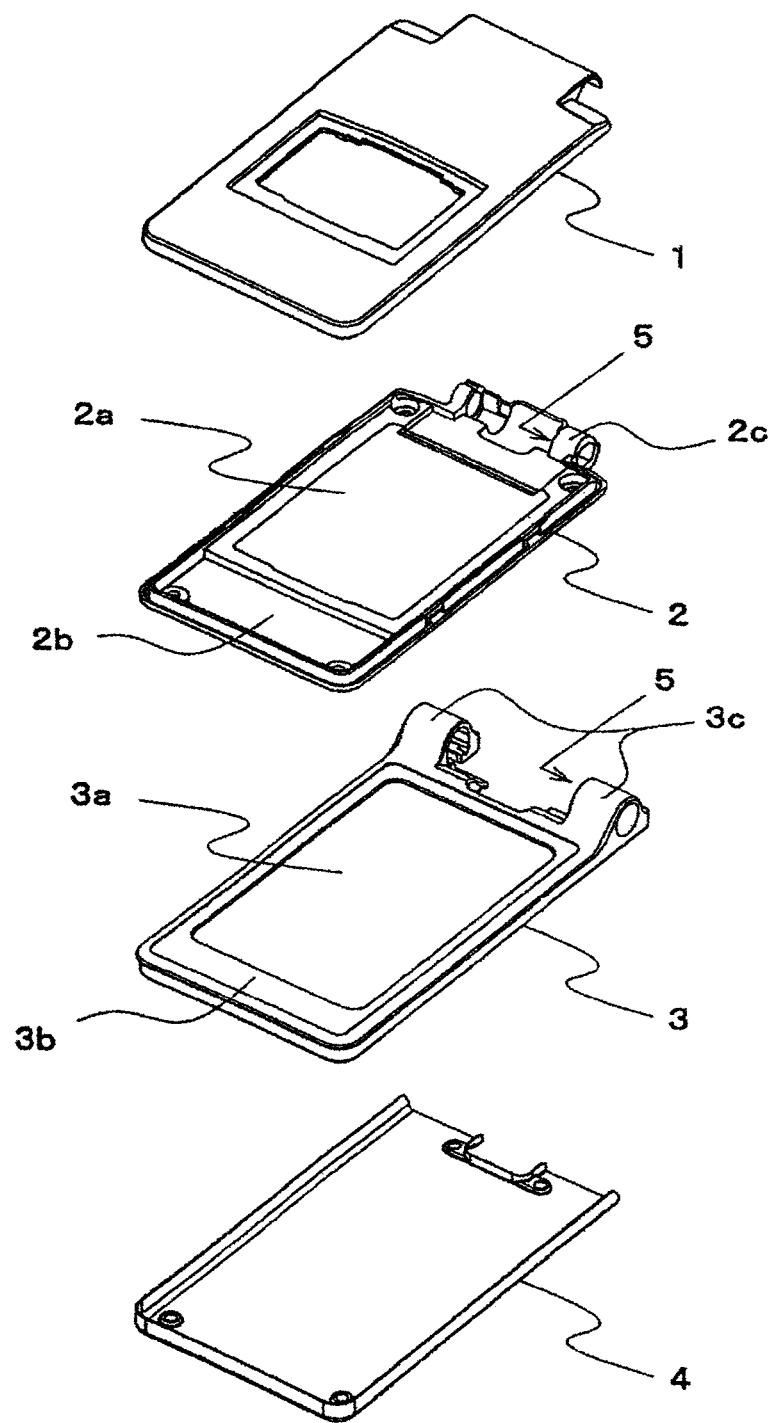
FIG. 3 is an exploded perspective view showing a main component in the foldable mobile phone of the exemplary embodiment.
Figure 4:
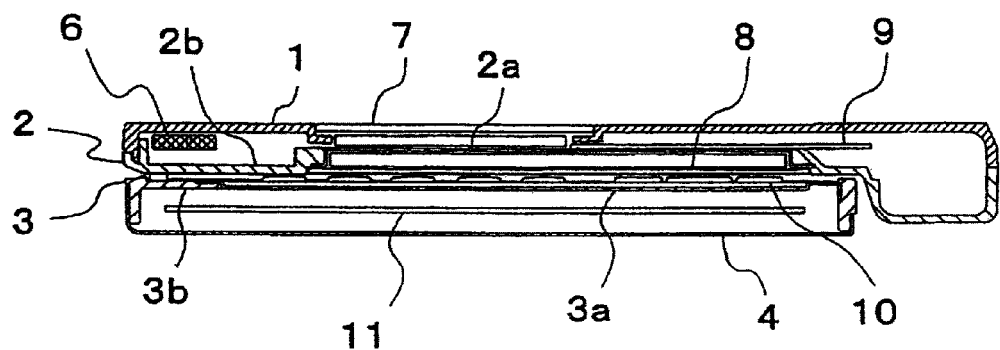
FIG. 4 is a sectional view taken along line A-A in FIG. 1 in the exemplary embodiment.

FIG. 3 is an exploded perspective view of the main components. FIG. 4 is a sectional view taken along line A-A in FIG. 1, and FIG. 5 is a sectional view taken along line B-B in FIG. 1.

Figure 5:
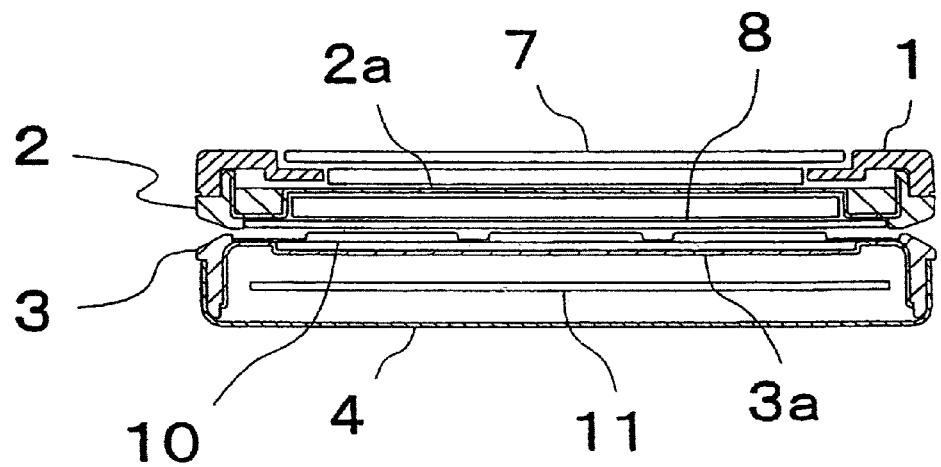
FIG. 5 is a sectional view taken along line B-B in FIG. 1 in the exemplary embodiment.

As shown in FIGS. 3 to 5, front case 2 of the display part and front case 3 of the operation part are configured by sheet metal parts 2a and 3a for the purpose of reducing thickness and obtaining reliable mechanical strength, and by resin parts 2b and 3b for the purpose of forming parts that have complicated shape and that are to be fitted, hinge parts 2c and 3c and the like to be fitted to rear cover 1 of the display part and rear cover 4 of the operation part. Front case 2 of the display part and front case 3 of the operation part are connected via hinge 5.

Printed board 9 mounted with electric components is provided in the display part's case comprising rear cover 1 of the display part and front case 2 of the display part. Printed board 11 mounted with electric components is provided in the case of the operation part comprising front case 3 of the operation part and rear cover 4 of the operation part.

In addition to printed board 9, antenna 6 is also provided in the case of the display part comprising rear cover 1 of the display part and front case 2 of the display part.

Next, the material composition of the case of foldable mobile phone 12 of the exemplary embodiment will be described in detail.

As shown in FIG. 3, the case of the display part of foldable mobile phone 12 is comprised of rear cover 1 of the display part and front case 2 of the display part.

Rear cover 1 of the display part is located facing the outside of the device, that is an exterior, when foldable mobile phone 12 is opened and closed, and therefore, is a component in which excellence in design is especially important and various outer design shapes are required. Therefore, a resin material from which various shapes are easily molded is used for the material of rear cover 1 of the display part.

Front case 2 of the display part is a component that is required to have such mechanical strength that main display part 8 will not break, because main display part 8, which occupies most of the area of front case 2 of the display part, is disposed in it as shown in FIG. 2. Front case 2 of the display part is also a component which requires that fitting portions that have complicated shapes be fitted to rear cover 1 of the display part, a hinge portion mounted with hinge 5 and the like are required.

Therefore, in front case 2 of the display part, a metal material that has both sufficient mechanical strength and thickness is used as the material of sheet metal part 2a holding main display part 8. Meanwhile, in front case 2 of the display part, a resin material which allows complicated shapes to be easily molded and size adjustment to be easily made, is used as the material of resin part 2b that forms a fitting part and hinge part 2c to which the hinge is mounted. Specifically, a composite material formed of combination of a metal material and a resin material used as the material of front case 2 of the display part.

The case of the operation part of foldable mobile phone 12 is comprised of front case 3 of the operation part and rear cover 4 of the operation part.

Rear cover 4 of the operation part is located facing the outside of the device, that is an exterior, when foldable mobile phone 12 is opened and closed, but is located on a back surface of foldable mobile phone 12, and therefore, rear cover 4 of the operation part is a component in which excellence in design is relatively unimportant. Therefore, it is not necessary that a plate sheet component have a complicated shape, and priority is given to using materials for rear cover 4 of the operation part that has reliable mechanical strength and sufficient thickness.

Front case 3 of the operation part is a component that whose mechanical strength is such that foldable mobile phone 12 is not broken when there is a need to press the operation keys—this is because key operation part 10, that occupies most of front case 3 of the operation part, is disposed in it as shown in FIG. 2. Front case 3 of the operation part is also a component which requires that complicated shapes be fitted to rear cover 4 of the operation part, a hinge part to which hinge 5 is mounted and the like be mounted on the front case 3.

Therefore, in front case 3 of the operation part, a metal material has both sufficient mechanical strength and thinness is used as the material for sheet metal part 3a holding key operation part 10. Meanwhile, in front case 3 of the operation part, a resin material, which allows complicated shapes to be easily molded and size adjustment to be easily made, is used as the material of resin part 3b that forms a fitting part and hinge part 3c to which the hinge is mounted. Specifically, a composite material formed of combination of a metal material and a resin material is used as the material of front case 3 of the operation part.

Next, based on the material composition of the case of foldable mobile phone 12 of the exemplary embodiment, a device configuration of foldable mobile phone 12 will be described in more detail.

As shown in FIG. 1, as one of the design elements, sub display part 7 is placed on rear cover 1 of the display part, in which many design elements are required.

As shown in FIG. 2, the hinge part is configured by hinge part 2c of front case 2 of the display part made of a resin material, on which main display part 8 occupying most part of front case 2 of the display part is placed, and hinge part 3c of front case 3 of the operation part made of a resin material, in which key operation part 10 occupying most of front case 3 of the operation part is placed.

As shown in FIGS. 4 and 5, the thickness of sheet metal part 2a of front case 2 of the display part, sheet metal part 3a of front case 3 of the operation part and rear cover 4 of the operation part, which are made of a metal material, is reduced small, and thereby, the thickness of foldable mobile phone 12 can be reduced. Further, due to the structure surrounded by the metal material of sheet metal part 2a of front case 2 of the display part, sheet metal part 3a of front case 3 of the operation part and rear cover 4 of the operation part, sufficient mechanical strength of foldable mobile phone 12 can be secured, and board 9 disposed inside the case of the display part, and board 11 disposed inside the case of the operation part are protected.

As shown in FIGS. 2 and 4, antenna 6 is placed at a position covered with a resin material that is used in rear cover 1 of the display part and resin part 2b of front case 2 of the display part, and sheet plate part 2a of front case 2 of the display part, which interferes with the characteristics of the antenna, is configured to be disposed at a certain distance from the antenna 6.

According to the exemplary embodiment, the respective plane portions of front case 2 of the display part and front case 3 of the operation part are made mainly of a metal material, and rear cover 4 of the operation part is made only of a metal material, whereby reduction in thickness, which cannot be achieved with a resin material, can be realized. Further, according to the exemplary embodiment, rear cover 1 of the display part is made of a resin material that is the same as that of the conventional foldable mobile phone, and thereby, the same degree of freedom of design can be obtained. Further, according to the exemplary embodiment, because, in particular, parts such as the fitting part and the hinge part of the case, have complicated shapes and which is not related to the thickness of the device in front case 2 of the display part and front case 3 of the operation part are made of a resin material, assemblability and disassemblability of the case can be kept the same level of those of the conventional foldable mobile phone. Further, according to the exemplary embodiment, the main three components that are front case 2 of the display part, front case 3 of the operation part and rear cover 4 of the operation part are configured mainly by a metal material, and thereby, foldable mobile phone 12 having sufficient mechanical strength can be provided.

Further, according to foldable mobile phone 12, the antenna part is disposed in the portion that is comprised of rear cover 1 of the display part that is made only of a resin material and of resin part 2b of front case 2 of the display part that is made of a resin material, whereby even when the antenna part is mounted in the device of the foldable mobile phone, the antenna is not shielded with the metal material, and degradation of the antenna characteristics can be avoided.

Further, in foldable mobile phone 12, rear cover 1 of the display part is made only of the resin material, and rear cover 4 of the operation part is comprised of only the metal material, whereby a weight difference occurs between rear cover 1 of the display part and rear cover 4 of the operation part. Therefore, in foldable mobile phone 12, in which the case of the operation part is handled for opening and closing and the case of the operation part is usually held by hand, the opening and closing operations are facilitated by the weight of the case of the display part being made relatively light. The holdability of foldable mobile phone 12 can be enhanced by making the weight of the case of the operation part relatively heavy. Further, when foldable mobile phone 12 is in the opened state, the center of gravity is located in the case of the operation part. Therefore, when foldable mobile phone 12 is placed on a desk or the like, the display part side will not fall down, and the state of the phone can be kept stable due to the case of the operation part and the desk being in close contact with each other.

Next, an exemplary embodiment of the present invention will be described. In the exemplary embodiment, a foldable mobile phone is also used as one example of a foldable mobile device, and the basic configuration is the same as that in the above described exemplary embodiment. Therefore, redundant explanation will be omitted.

This exemplary embodiment differs from the above described exemplary embodiment in the points that rear cover 1 of the display part of foldable mobile phone 12 is configured by only a metal material, and that rear cover 1 of the display part is configured by a composite material in which a resin material and a metal material are combined.

First, when rear cover 1 of the display part is made only of a metal material, there is the disadvantage that this limits the shape of the design, and the disadvantage that an antenna mounted inside a case made of a metal will cause the antenna's characteristic to degrade, as compared with the case in which rear cover 1 of the display part is made of a resin material. Therefore, in many cases, the mounting position of the antenna needs to be located outside of the metal case instead of inside of the case in order to that the characteristics of the antenna will no be influenced. However, when rear cover 1 of the display part is made only of a metal material, the thickness of foldable mobile phone 12 can be further reduced, and the mechanical strength can be further improved.

Next, when rear cover 1 of the display part is configured by a composite material of a resin material and a metal material, processing of fine design shapes cannot be applied to the metal material occupying most part of the design part, but the antenna can be mounted inside the case, and therefore, foldable mobile phone 12 can be configured to be thin.

Figure 6:
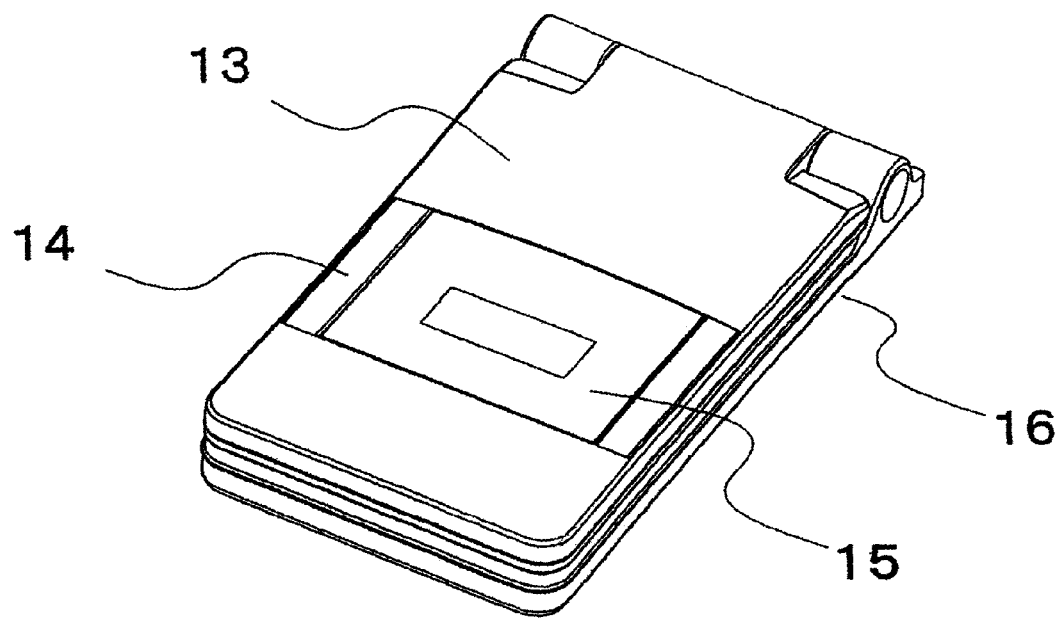
FIG. 6 is a perspective view showing a closed state in a foldable mobile phone of an exemplary embodiment.
Figure 7:
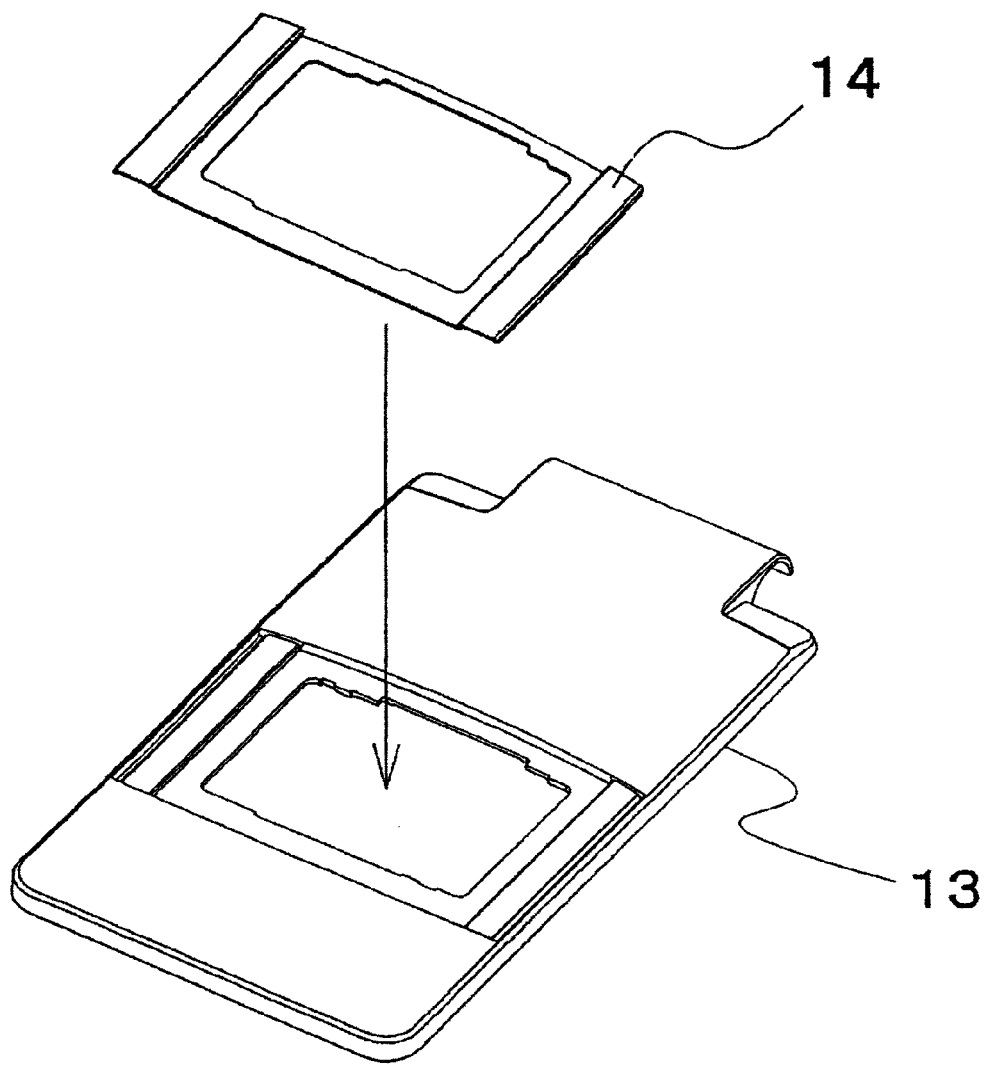
FIG. 7 is a perspective view showing a constitution of a rear cover of a display part in the exemplary embodiment.

One example of the configuration of foldable mobile phone 12 of the exemplary embodiment is shown in FIG. 6. Plate 14 that is made of a metal material and that is used as a decorative design part is fixed to a perimeter portion of sub display part 15 in rear cover 13 of the display part that is constructed only of a resin material, and a result, a synergistic effect which combines excellence design and good mechanical strength can be realized while maintaining a balance between thinness and weight in the foldable mobile phone 12. Case 16 of the operation part is similarly made of combination of front case 3 of the operation part and rear cover 4 of the operation part described in the previous exemplary embodiment. Plate 14 that is made of the metal material is a decorative design part that may be fitted into rear cover 13 of the display part that is made only of a resin material as shown in FIG. 7.

The above described respective embodiments are exemplary embodiments of the present invention, and various modifications can be made within the scope without departing from the spirit of the present invention. For example, the present invention includes a method for manufacturing a foldable mobile device by forming rear cover 1 of the display part, front case 2 of the display part, front case 3 of the operation part, rear cover 4 of the operation part and the like from the respective materials in the above described respective embodiments.

The invention claimed is:

1. A housing, comprising:
   a metal structure comprising a first plate, a second plate, and a first side plate, the first plate and the second plate being connected to the first side plate, and
   a resin structure in contact with the first plate,
   wherein pairs of the first plate and the first side plate are respectively provided on both ends of the second plate so that the pairs are mutually opposite, wherein the metal structure is a metal sheet plate comprised of the pair of first plates, the pair of first side plates, and the second plate.

2. A housing, comprising:
   a metal structure comprising a metal sheet plate with i) a pair of first plates at a first level, each first plate having an inside edge, ii) a second plate at a second level elevated relative to the first level, the second plate having a pair of opposite, outside edges, and iii) a pair of first side plates, each first side plate having a first edge connected to a respective one of the inside edges of the first plates and to a respective one of the outside edges of the second plate such that each of the first plates is connected to the second plate by one of the first side plates; and
   a resin structure in contact with the each of the first plates and each of the first side plates and located at the pair of opposite, outside edges of the second plate,
   wherein the pair of the first plates and the pair of first side plates are respectively provided on both ends of the second plate so that the pairs are mutually opposite.

3. The housing according to claim 2, wherein,
   said metal sheet plate further comprises i) a pair of second side plates connected to the second plate at further opposite, outside edges of the second plate, and ends of each of the second side plates are connected to ends of the first side plates, and ii) a pair of third plates at the first level and having longitudinal edges attached to longitudinal edges of the second side plates, wherein the resin structure is in contact with each of the second side plates.

4. The housing according to claim 3, wherein the resin structure comprises an aperture that exposes an opposite surface which is opposite to the side of the second plate at which the first side plates and the second side plates are arranged.

5. The housing according to claim 3, wherein, said metal sheet plate further comprises a pair of third side plates having longitudinal edges attached to outside longitudinal edges of the first plates, the third side plates extending upward from the first level toward the second level, and the resin structure contacts the third side plates.

* * * * *